United States Patent [19]
Takalo et al.

[11] Patent Number: 5,387,886
[45] Date of Patent: Feb. 7, 1995

[54] DUPLEX FILTER OPERATING AS A CHANGE-OVER SWITCH

[75] Inventors: Tapio Takalo; Aimo Turunen; Pauli Nappa, all of Oulu, Finland

[73] Assignee: LK-Products OY, Kempele, Finland

[21] Appl. No.: 58,772

[22] Filed: May 7, 1993

[30] Foreign Application Priority Data

May 14, 1992 [FI] Finland ................................ 922210

[51] Int. Cl.$^6$ ............................................. H01P 5/12
[52] U.S. Cl. ................................... 333/101; 333/132; 333/134; 333/136; 370/38
[58] Field of Search ............... 333/101, 103, 104, 110, 333/203-207, 219, 219.1, 222, 223, 125, 126, 127, 128, 136, 129, 132, 134; 370/24, 29, 32, 38; 455/73, 78, 83

[56] References Cited

U.S. PATENT DOCUMENTS

| | | | |
|---|---|---|---|
| 4,987,392 | 1/1991 | Clark et al. | 333/103 |
| 5,023,935 | 6/1991 | Vancraeynest | 333/110 X |

FOREIGN PATENT DOCUMENTS

| | | | |
|---|---|---|---|
| 0446050A2 | 9/1991 | European Pat. Off. | H04B 1/44 |
| 2664766 | 1/1992 | France | H04B 1/50 |

OTHER PUBLICATIONS

Electronic Design, vol. 17, No. 14, 5 Jul. 1969, p. 80 Van Sickle "Simple Duplexer Requires Only Inexpensive Components".

*Primary Examiner*—Paul Gensler
*Attorney, Agent, or Firm*—Perman & Green

[57] ABSTRACT

The invention discloses a three-port filter being able to connect alternately a receiver and a transmitter to a common antenna in a ratio system operating by the time division principle. The first signal path between the first and the third ports comprises all resonators (R1, R2, R3, R4). The second port is connected to one (e.g. R3) of the resonators in the first signal path, whereby a first subset (R1, R2) of resonators lies between the first and the second ports, and a second subset (R3, R4) of resonators forming the signal path between the second and the third ports lies between the second and the third ports. The resonators of either subset are switchable resonators, whose resonance frequencies can be shifted between two frequencies by an external control (Control). At the first control value of the control (Control) the resonators of this subset pass the RF-signal substantially without attenuation, and at the second control value they strongly attenuate said signal.

11 Claims, 3 Drawing Sheets

FIG. 1.
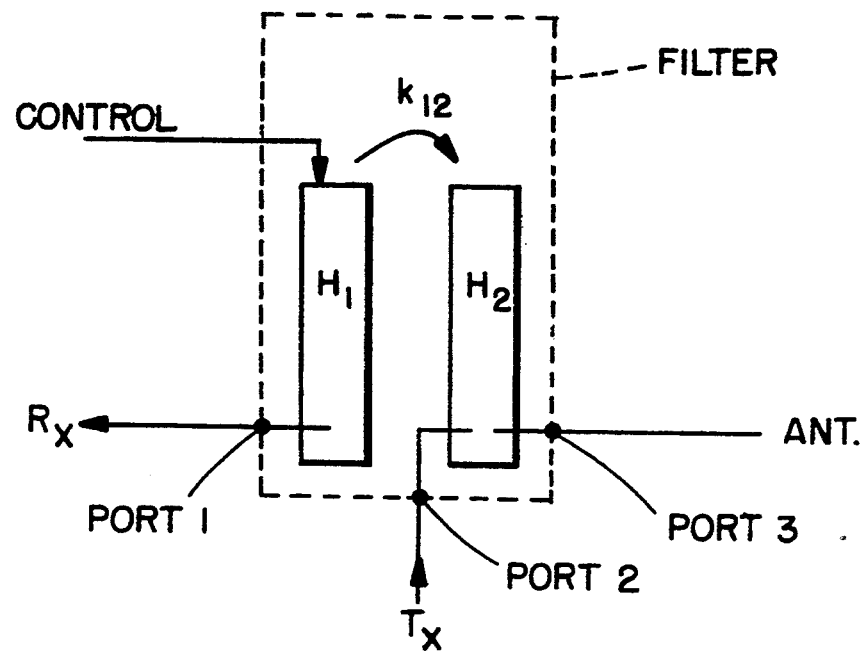
FIG. 2A.
FIG. 2B.
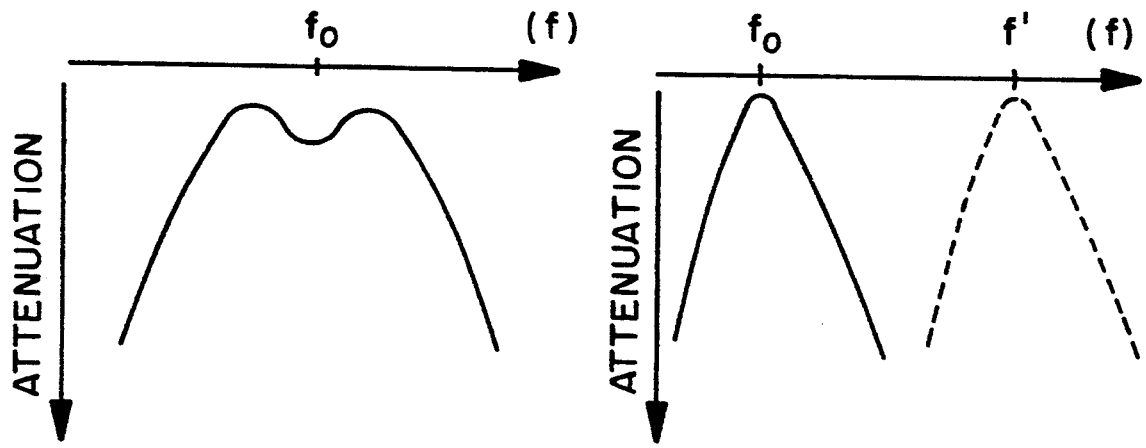

DUPLEX FILTER OPERATING AS A CHANGE-OVER SWITCH

The present invention relates to a filter. In particular the present invention relates to a filter operating as a change-over switch.

BACKGROUND OF THE INVENTION

For example in radio engineering a filter of this kind is known as a duplex filter, through which the transmitter and the receiver of an apparatus are connected to a common antenna. The filter is designed so that the transmit signal can not reach the receiver but propagates to the antenna, and so that the received signal from the antenna can not reach the transmitter but propagates to the receiver. This is possible as the filters of the transmit branch and the receive branch are dimensioned so that when one is passing, then the other is stopping. This in turn is possible only when the transmit frequency band and the receive frequency band are separated. All present duplex filters of analog radiotelephones operating in duplex mode work in this way. The same principle naturally holds true for any three-port filter, which in a common circuit means incorporates two signal paths for different frequency bands.

However, the situation is different if the three-port circuit means must process signals at the same frequency band. Then it is not possible to use the duplex principle, because the same attenuation would be present between different ports, whereby power into one port is divided into the two other ports. If the signals to be processed appear at different moments, then the three-port circuit means can be realized as a simple change-over switch being able to connect e.g. port 1 and port 2 alternately to port 3. In fact the situation is like this in radiotelephone systems operating according to the time division principle on a single frequency, and as an example of these we can mention the DECT system (Digital European Cordless Telephone). In such systems transmission and reception occur at the same frequency but in different time slots, so that a change-over switch can be used to connect the antenna to the receiver during the receive time slot and correspondingly the transmitter to the antenna during the transmit time slot.

When a change-over switch is used as a three-port circuit means for the above described purpose it must naturally be dimensioned to tolerate the highest transmit power of the apparatus, which could be of the order of 20 kW. This results in a power consuming "heavy" switch, which means attenuation of the signal passing through the switch. The attenuation of the antenna switch is of the order of 7 dB, which has an adverse effect when a weak signal is being received. An active semiconductor switch is non-linear and therefore it presents an inconvenience in circuit design. Thus a filter realized with passive components would be a good solution, but this far no three-port filter having a change-over function suitable for the processing of two signals with the same frequency was presented.

This invention presents a means using passive filter components to realize a change-over switch for signals having the same frequency but appearing at different moments. The invention is well suited to be used also when the frequencies are different, but even then time division multiplexing is required.

Here we utilize the known basic fact that the resonance frequency of a resonator can be changed, e.g. by converting a quarter-wave transmission-line resonator to be a half-wave resonator, whereby the resonance frequency is doubled. It is well known that radio frequency filters in practice may have adjusting means, e.g. adjusting screws, which in one way or another act on the capacitive load at the open end of the resonator when they are manually turned. In fact frequency shift methods are based on a similar adjustment method, which is modified so that the adjusting means is not manually but electrically controlled.

Filters based on helix resonators can use a stepping motor acting on a means moving in the capacitive or inductive field of the resonator. In a ceramic resonator a capacitance diode can be mounted at the loaded end of the resonator, between the upper end of the bore and the earthed top or side face, whereby the load capacitance and thus the resonance frequency is adjusted by adjusting the capacitance. The capacitance diode could also be mounted in the bore of the resonator.

The applicant's Finish patent application FI-913088, dated 25.6.1991, discloses a means to shift the resonator characteristic in the frequency plane. According to the method a strip line resonator is mounted in the electromagnetic field of the resonator, below called the main resonator, whereby the other end of the strip line can be shorted with a controllable switch. When the switch is open the strip line resonator is a lambda/2 resonator having the resonance frequency $f_O$, which is so far frop the main resonator's resonance frequency that it hardly at all affects the main resonator. When the switch is closed it shorts the other end of the strip line, transforming the strip line into a lambda/4 resonator with the resonance frequency $f_0/2$. This is arranged to be so close to the resonance frequency of the main resonator that its resonance frequency will have a frequency shift delta f. By suitable connections at the ends of the strip line it is also possible to arrange the switch to have the opposite action compared to the above. The method is particularly well suited for application in connection with dielectric resonators, particularly with known resonator structures having on one uncoated side surface coupling patterns for the coupling to the resonator. The length of the strip line is selected to suit the resonator frequency.

The method's effect is based on the fact an electromagnetic coupling is created between the strip line and the main resonator because the strip line acts as a "secondary resonator". The stronger the coupling, the stronger effect the secondary resonator has on the frequency shift. The design of the main resonator and the dimensions of the secondary resonator and its location relative the main resonator affect the strength of the coupling. Preferably the switch can be a diode or a capacitance diode.

Some known means to shift the resonance frequency of the resonator were described above, and in this invention any known means may be used.

SUMMARY OF THE INVENTION

According to a present invention there is provided a filter comprising resonators, in which a first signal can pass in a first time slot between a first port and a third port and a second signal can pass in a second time slot between a second port and the third port, characterized in that the first signal path between the first and the third ports comprises a plurality of resonators, the second port is connected to one of said plurality of resonators in the first signal path, whereby a first subset of resonators lies between the first and the second ports, and a second subset of resonators lies between the second and the third ports, forming the signal path between the second and the third ports, the resonators of one subset are switchable resonators, whose resonance frequencies can be shifted between two frequencies, the resonators of said one subset being connected to an external control means, such that on receipt of a first control signal from the control means the resonators of said subset allow the signal to pass through substantially without attenuation, and on receipt of a second control signal from the control means the resonators attenuate said signal.

The filter disclosed in claims 2-6 is suited for single frequency time division systems, and the filter disclosed in claims 7-10 is particularly suited for dual frequency systems.

The filter to be used is thus a filter in which the signal between the first and the third ports passes all resonator circuits, but on the signal path between the second and the third ports there is only a part of the resonator circuits. The function is as follows: the resonator circuits are tuned so that the operating frequency signal propagates substantially without attenuation from port 1 to port 3 (or vice versa) and from port 2 to port 3 (or vice versa). Other frequencies than the operating frequency are strongly attenuated. It is essential that the operation is time divided, whereby signals propagate at different moments between ports 1-3 and ports 2-3. If the operating frequency signal now has to pass without attenuation from port 2 to port 3, then the frequencies of the resonators between ports 1 and 2 are controlled to shift so much that the transmission characteristic of the filter part between ports 1 and 2 shifts far away from the original frequency and instead we have a stop-band function. Then the signal meets a high impedance in the direction from port 2 towards port 1, but a very low impedance towards port 3. The signal power supplied to port 2 is thus output from port 3, but hardly no power is output from port 1.

BRIEF DESCRIPTION OF THE DRAWINGS

An embodiment of the invention is described, by way of example, with reference to the following schematic figures, in which;

FIG. 1 illustrates a three-port filter operating as a change-over switch and comprising two circuits;

FIGS. 2a and 2b show the filter's transmission characteristics for transmission and reception;

DETAILED DESCRIPTION OF THE INVENTION

Figure 3:
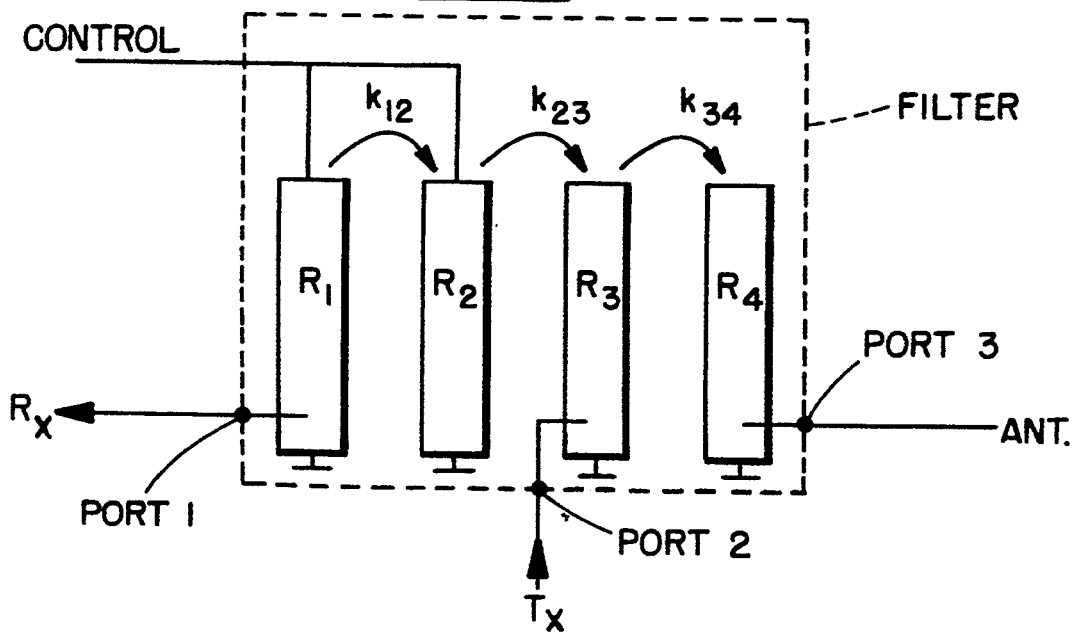
FIG. 3 shows a three-port filter comprising four circuits.

For the sake of clarity the embodiment in the below described examples concerns an antenna switch of a radiotelephone, but it should be noted that the invention is applicable for other purposes.

The circuit arrangement of FIG. 1 shows an antenna filter realized with a minimum number of components. Port 1 of the filter is connected to the receiver, port 2 to the transmitter and port 3 to a common antenna. The basic assumption is that the transmit frequency Tx and the receive frequency Rx are the same, but that transmission and reception occur interleaved in different time slots, as is the case in the TDMA system.

The filter comprises two resonator circuits R1 and R2. The resonators can be of any known type: coaxial, strip line, helix or ceramic resonators. The coupling between the circuits is marked by $k_{12}$. Assume first that we have a receive time slot. Then the signal from the antenna Ant is received in port 3. The resonator circuits are tuned so that their frequency response has a pass-band at the receive frequency. This is illustrated by FIG. 2a, in which the attenuation characteristic shows the response of a two-circuit filter. The center frequency $f_0$ is tuned to be the same as the system's operating frequency (=transmit and receive frequency). The received signal is only slightly attenuated when it propagates from port 3 to port 1, because according to FIG. 2a the filter formed by the resonators R1 and R2 has a negligible attenuation. Of course the signal can also pass through port 2 to the transmitter, but this causes no inconvenience because the transmitter is off.

When the transmit time slot begins, the control logic of the radio apparatus switches on the transmitter and at the same time also supplies a control signal Control to the resonator R1. Then the resonance frequency of this resonator changes to f'. If the control transformed the quarter-wave transmission-line to a half-wave transmission-line, then the frequency f' of resonator R1 would be the double compared to the frequency before control was implemented, or f' would be close to $2*f_0$. The transmit branch now contains a filter of a single resonator R2, whose response is shown in FIG. 2b by a continuous line. It has a negligible attenuation at the operating frequency $f_0$, and thus the transmit signal Tx is attenuated hardly at all when it propagates from port 2 to port 3 and further to the antenna. On the other hand the transmit signal is strongly attenuated towards port 1, because the pass-band of the resonator 1 is shifted far away from the operating frequency $f_0$. The dashed line characteristic of FIG. 2b illustrates the frequency response between ports 2 and 1. Thus the transmit power can not propagate to the receive branch Rx.

Figure 4A:
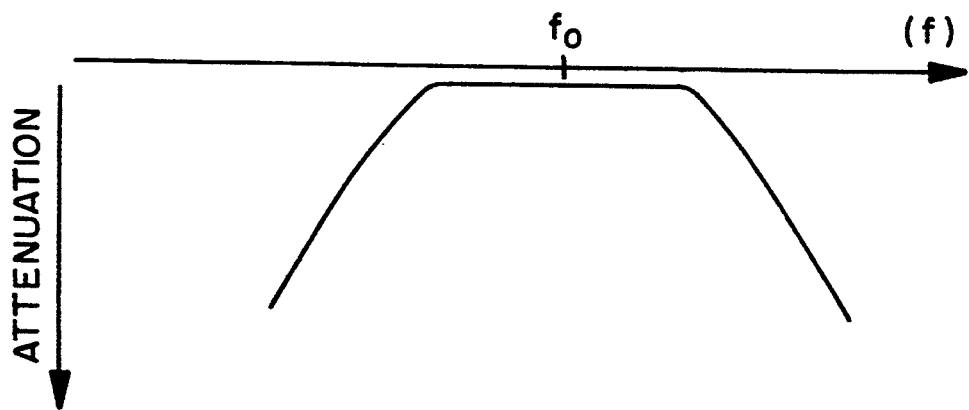
FIGS. 4a and 4b show the transmission characteristics for transmission and reception of the filter in FIG. 3.

The circuit arrangement of FIG. 1 is a minimum arrangement in order to realize the invention. In practice the filter must use a plurality of resonators in order to meet the specifications of each application. Thus the filter of FIG. 3 operating as a change-over switch is intended to be an antenna filter in a DECT telephone, and a four circuit filter is required to meet the specification. It contains the resonators R1, R2, R3 and R4. Port 1 connects the first circuit R1 to the receive branch Rx, port 2 connects the transmit branch Tx to the third circuit R3, and the antenna line is connected through port 3 to the fourth circuit R4. The connections to the resonators are made by any known method, inductively, capacitively, or galvanically, which is not essential for the invention. During the receive time slot the signal propagates from port 3 to port 1, and thus all circuits are used. In order to meet the requirements presented by the specifications the resonance frequencies are selected and the couplings $k_{12}$, $k_{23}$, $k_{36}$ calculated to provide the desired transmission characteristic around the center frequency f0, which is illustrated in FIG. 4a. Then the received signal, which depending on the channel can vary within the transmission characteristic, will pass without hindrance to the receiver. The transmitter is off, so that no power passes from the port 2 to the receive branch Tx.

Figure 4B:
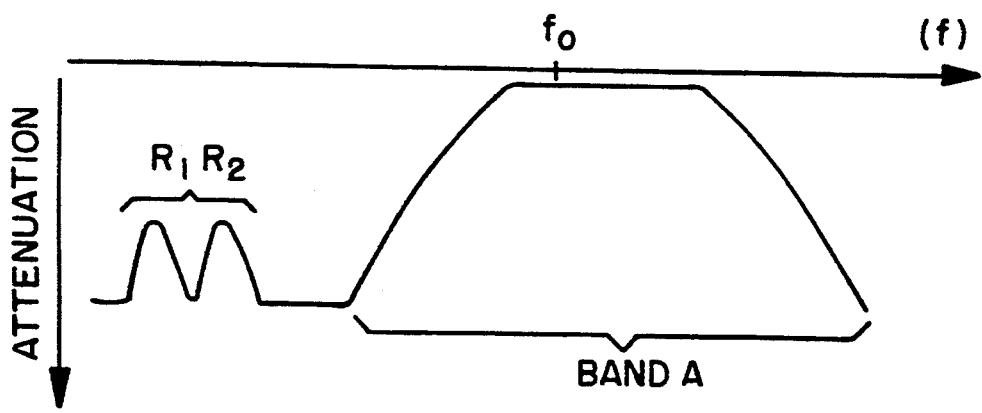

When the transmit interval begins, the control logic supplies the control signal Control, whereby the resonance frequencies of the resonators R1 and R2 shift substantially, e.g. downwards in the frequency plane. Then the transmission characteristic measured between ports 1 and 2 will be according to FIG. 4b. The narrower pass-band A at the center frequency $f_0$ is provided by the resonator circuits R3 and R4. A part of the original pass-band according to FIG. 4a provided by the resonators R1 and R2 is shifted far away to a lower frequency. This is seen in the characteristic of FIG. 4b as a "shifted band", which thus represents the transmission characteristic between ports 1 and 2. Then the transmit signal at the port 2 having the same frequency as the receive frequency will see a high impedance towards the port 1, and thus the transmit signal output from port 1 is strongly attenuated and does not damage the front end of the receiver. The impedance seen towards port 3 is low, and the transmit signal passes without hindrance to port 3 and from there to the antenna. The pass-band between ports 2 and 3 is shown in FIG. 4b marked as "band A".

In the case of FIGS. 4a and 4b the transmit branch has a filter with two circuits (resonators R3 and R4) and the receive branch has a filter with four circuits (resonators R1, R2, R3 and R4). It is important to note that no exact shift is required when the resonators R1 and R2 are offset during the transmission. A sufficient shift is enough. This is important, because it is substantially more demanding to realize an exact offset than to have a "sufficient" shift.

Figure 5:
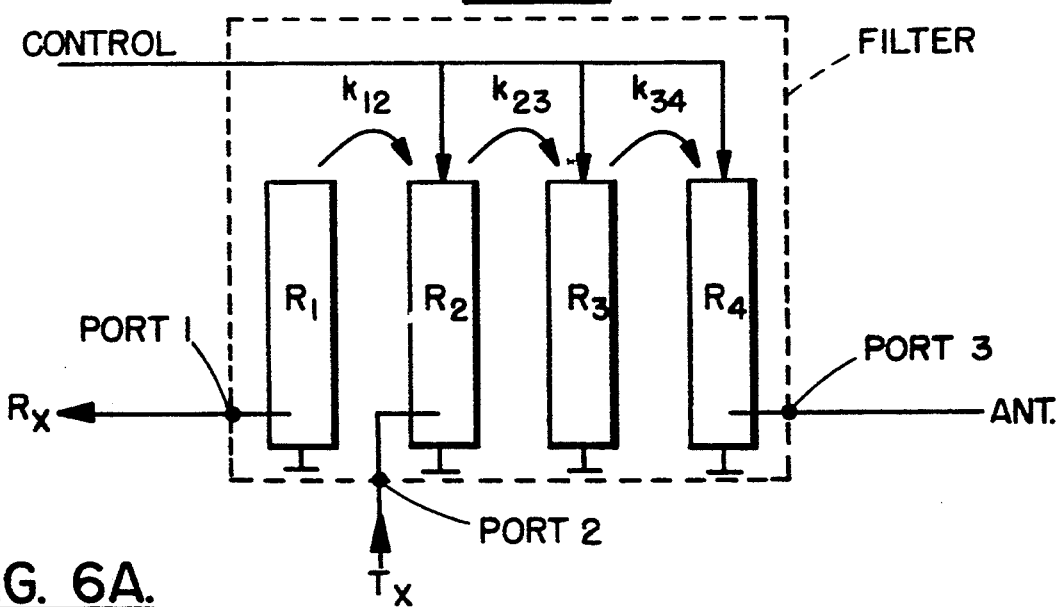
FIG. 5 shows a filter, when there are two operating frequencies.
Figure 6A:
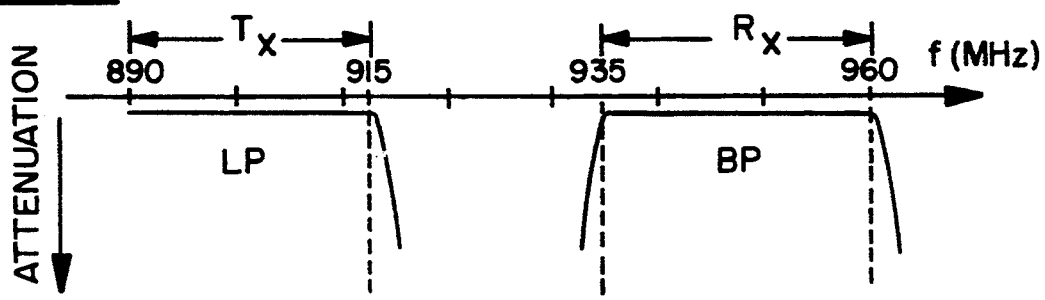
FIG. 6a shows the transmission characteristics of the antenna filter of a known system.

FIG. 5 illustrates a four-circuit filter with a change-over function and having shiftable resonators between ports 2 and 3, instead of having them between the ports 1 and 2 as above. This design is suitable to be used particularly when the transmit and receive frequencies are different. The application could be e.g. a GSM telephone, in which the receive band is 935–960 MHz and the transmit band 890–915 MHz. Presently an antenna filter of the GSM telephone is realized using 7 resonators, of which four are required for the band-pass filter of the Rx branch and three for the low-pass filter of the Tx branch. This is done in order to have the required GSM antenna filter's transmission characteristic of FIG. 6a. The required transmission characteristic can be obtained using a filter operating as a change-over switch and connected according to FIG. 5 using only four resonators. In the filter of FIG. 5 the frequencies of the three resonators R2, R3 and R4 between ports 2 and 3, or the transmit branch filter's response, can be shifted in the frequency plane by the control signal Control. The received signal propagates from port 3 through all four resonators to port 1 and further to the receiver.

Figure 6B:
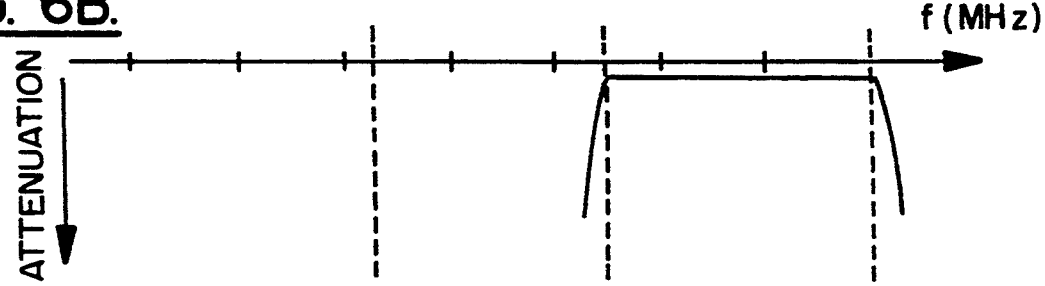
FIGS. 6b and 6c show the transmission characteristics of the filter in FIG. 5.
Figure 6C:
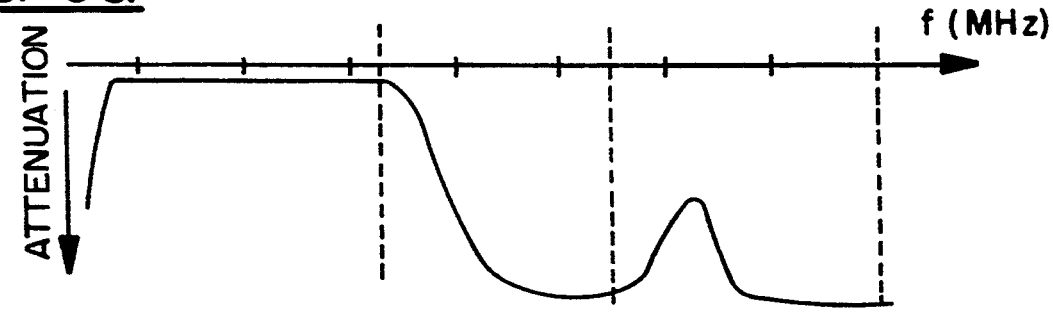

The resonance frequencies of the resonators and the couplings $k_{12}$, $k_{23}$, $k_{34}$ between the resonators are selected so that during the receive time slot the transmission characteristic of the filter between port 3 and port 1 is according to FIG. 6b. When the transmit time slot begins the telephone's control logic supplies a control signal Control to the resonators R2, R3 and R4. The frequency of these resonators is shifted downwards, exactly so that the filter formed by them and through which the transmit signal passes, has a transmission characteristic with a pass-band at the transmit frequency of 890–915 MHz. This is illustrated by the left side of the transmission characteristic of FIG. 6c. On the right hand side the resonator R1 causes at the receive frequency a small rise, whose frequency is not shifted. This rise has no significance for the transmitted signal, and the transmit signal supplied to port 1 is sufficiently attenuated and does not damage the receiver.

The control signal Control changes its state when the receive time slot begins, whereby the frequency of the resonators R2, R3 and R4 shifts upwards and the transmission characteristic is again according to FIG. 6b. The transmission characteristic can be changed in accordance with the control signal, and the filter for the transmit signal has three circuits and the filter for the receive signal has four circuits. Thus it is possible to realize the required GSM filter with only four resonators, instead of the seven resonators used in prior art. The filter is thus considerably smaller and lighter, which is a great advantage (when we aim at small-sized and light telephones).

The above described filter operating as a change-over switch meets well the requirements on the switch and the filtering. It causes a small attenuation compared to a switch, which strongly attenuates the signal. The number of mounted components decreases compared to known antenna filters. When the invention is used in single frequency systems having the same signal frequency at the ports, then we shift some filters sufficiently far away from the operating frequency. This is a great advantage as it is much easier to shift a filter away from its operating frequency than to shift it to the operating frequency. In the last mentioned case the shift must be very exact and this is more difficult to obtain. An exact shift is required if the invention is applied to double frequency systems, of which FIGS. 5 and 6 are examples.

The invention is above described as an embodiment for an antenna switch. Obviously, and remaining within the scope of the claims it is possible to apply it in any environment requiring a three-port filter with a change-over feature. The frequency shift can be provided in accordance with the application, either for the filter part between ports 1 and 2, or for the filter part between ports 2 and 3, whereby the energy is directed to pass through the desired circuits. The number of resonators is not limited in any way, and they could be of any type. The invention is particularly well suited to be used in connection with ceramic resonators, and in connection with such shiftable resonators which are described in the above mentioned Finnish patent application FI-913088. When the resonator is shifted away from the resonance frequency, it is then possible to utilize a capacitance diode acting as a switch, because the RF-voltage superposed in the capacitance diode causes no inconvenience because an offset with an exact magnitude is not at all required.

What is claimed is:

1. A filter comprising resonators, in which a first signal can pass in a first time slot between a first port and a third port and a second signal can pass in a second time slot between a second port and the third port, characterized in that the first signal path between the first and the third ports comprises a plurality of resonators, the second port is connected to one of said plurality of resonators in the first signal path, whereby a first subset of resonators lies between the first and the second ports, and a second subset of resonators lies between the second and the third ports forming the signal path between the second and the third ports, the resonators of one subset are switchable resonators, whose resonance frequencies can be shifted between two frequencies, the resonators of said one subset being connected to an external control means, such that on receipt of a first control signal from the control means the resonators of said one subset allow the signal to pass through substantially without attenuation, and on receipt of a second control signal from the control means the resonators of said one subset attenuate said signal.

2. A filter according to claim 1, wherein that the frequency of the first and second signals is substantially equal to the operating frequency of a system with which the filter is used.

3. A filter according to claim 2, wherein the control signal of the control means during the first time slot controls the resonators of the first subset to pass a signal at the operating frequency.

4. A filter according to claim 2, wherein that the resonant frequencies of the resonators between the first and the third ports and the couplings between the resonators are dimensioned so that the filter thus formed has a low attenuate function at the operating frequency.

5. A filter according to claim 2, wherein that the control value from the control during the second time slot controls the resonators of the first subset to attenuate a signal at the operating frequency.

6. A filter according to claim 5, wherein that the control signal of the control means shifts the resonance frequencies of the first subset of resonators away from the operating frequency.

7. A filter according to claim 1, wherein that the first and second signals have a different frequency, and that the control means during the first time slot controls the resonators of the second subset to transmit the first signal.

8. A filter according to claim 7, wherein that the frequencies of the resonators between the first and the third ports and the couplings between them are dimensioned so that the filter formed by them transmits at the frequency of the first signal.

9. A filter according to claim 7, wherein that the control means during the second time slot controls the resonators of the second subset to transmit the second signal.

10. A filter according to claim 9, wherein that the control means offsets the resonance frequencies of the first subset of resonators by an exact amount.

11. Filter according to claim 1, wherein that the filter is the antenna filter of a radio apparatus and that the first port is connected to the receiver branch, the second port is connected to the transmitter branch and the third port is connected to the antenna, whereby the filter operates as a change-over switch between the first and the second ports.

* * * * *